US012783853B2

(12) United States Patent
Zhang et al.

(10) Patent No.: US 12,783,853 B2
(45) Date of Patent: Nov. 3, 2026

(54) CONTRASTIVE LEARNING AND MASKED MODELING FOR END-TO-END SELF-SUPERVISED PRE-TRAINING

(71) Applicant: Google LLC, Mountain View, CA (US)

(72) Inventors: Yu Zhang, Mountain View, CA (US); Yu-An Chung, Mountain View, CA (US); Wei Han, Mountain View, CA (US); Chung-Cheng Chiu, Mountain View, CA (US); Weikeng Qin, Sunnyvale, CA (US); Ruoming Pang, New York, NY (US); Yonghui Wu, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 948 days.

(21) Appl. No.: 18/012,391

(22) PCT Filed: Jul. 28, 2022

(86) PCT No.: PCT/US2022/038699
§ 371 (c)(1),
(2) Date: Dec. 22, 2022

(87) PCT Pub. No.: WO2023/009740
PCT Pub. Date: Feb. 2, 2023

(65) Prior Publication Data

US 2024/0104352 A1 Mar. 28, 2024

Related U.S. Application Data

(60) Provisional application No. 63/226,504, filed on Jul. 28, 2021.

(51) Int. Cl.
*G06N 3/045* (2023.01)
*G06N 3/0455* (2023.01)

(52) U.S. Cl.
CPC .................................. *G06N 3/0455* (2023.01)

(58) Field of Classification Search
CPC ...................................................... G06N 3/045
See application file for complete search history.

(56) References Cited

U.S. PATENT DOCUMENTS

2021/0089724 A1 * 3/2021 Luong .................... G06F 40/40

OTHER PUBLICATIONS

Zhang, "Transformer Transducer: A Streamable Speech Recognition Model With Transformer Encoders and RNN-T Loss" (Year: 2020).*

(Continued)

*Primary Examiner* — Van C Mang
(74) *Attorney, Agent, or Firm* — DORITY & MANNING, P.A.

(57) ABSTRACT

Provided are improved end-to-end self-supervised pre-training frameworks that leverage a combination of contrastive and masked modeling loss terms. In particular, the present disclosure provides framework that combines contrastive learning and masked modeling, where the former trains the model to discretize input data (e.g., continuous signals such as continuous speech signals) into a finite set of discriminative tokens, and the latter trains the model to learn contextualized representations via solving a masked prediction task consuming the discretized tokens. In contrast to certain existing masked modeling-based pre-training frameworks which rely on an iterative re-clustering and re-training process or other existing frameworks which concatenate two separately trained modules, the proposed framework can enable a model to be optimized in an end-to-end fashion by solving the two self-supervised tasks (the contrastive task and masked modeling) simultaneously.

20 Claims, 6 Drawing Sheets

(56) References Cited

OTHER PUBLICATIONS

Anmol Gulati, "Conformer: Convolution-augmented Transformer for Speech Recognition" 2020 (Year: 2020).*
International Preliminary Report on Patentability for Application No. PCT/US2022/038699, mailed Feb. 8, 2024, 9 pages.
Gulati et al., "Conformer: Convolution-augmented Transformer for Speech Recognition", arXiv:2005.08100v1, May 16, 2020, 6 pages.
Baevski et al., "wav2vec 2.0: A Framework for Self-Supervised Learning of Speech Representations", arXiv:2006.11477vl, dated Jun. 20, 2020, 20 pages.
International Search Report and Written Opinion for Application No. PCT/US2022/038699, mailed Dec. 5, 2022, 13 pages.
Hsu et al., "HuBERT: Self-Supervised Speech Representation Learning by Masked Prediction of Hidden Units", arXiv:2106.07447v1, Jun. 14, 2021, 10 pages.

* cited by examiner

CONTRASTIVE LEARNING AND MASKED MODELING FOR END-TO-END SELF-SUPERVISED PRE-TRAINING

PRIORITY CLAIM

This application is based upon and claims the right of priority under 35 U.S.C. § 371 to International Application No. PCT/US2022/038699 filed on Jul. 28, 2022, which claims the benefit of U.S. Provisional Application Ser. No. 63/226,504 filed Jul. 28, 2021.

FIELD

The present disclosure relates generally to machine learning. More particularly, the present disclosure relates to improved end-to-end self-supervised pre-training frameworks that leverage a combination of contrastive and masked modeling loss terms.

BACKGROUND

The development of techniques that leverage large-scale unannotated data to improve the performance of machine learning models on various tasks has been a longstanding research problem. To date, there have been two major approaches for utilizing unlabeled data for tackling such semi-supervised tasks.

The first line of work is self-training, also known as pseudo-labeling, where the system starts with training a teacher model using initially available labeled data. Next, the teacher model is used to label the unlabeled data. The combined labeled and pseudo-labeled data are then used to train a student model. The pseudo-labeling process can be repeated multiple times to improve the quality of the teacher model. Self-training has been a practically useful and extensively studied technique for a number of different tasks and domains.

A second direction that takes advantage of unlabeled data is unsupervised pre-training, or self-supervised pre-training. In unsupervised pre-training, a model is first trained to complete a proxy task that is designed to only consume unlabeled data (hence being called "unsupervised"). Such proxy task is commonly believed to be capable of initializing the parameters of the model at a good starting point before it is being trained on the supervised data. Significant recent research effort has been made to develop proxy tasks that allow models to perform well when the models are fine-tuned on certain downstream tasks. There have also been studies that show that the gains brought by self-training and unsupervised pre-training are additive for certain downstream tasks.

SUMMARY

Aspects and advantages of embodiments of the present disclosure will be set forth in part in the following description, or can be learned from the description, or can be learned through practice of the embodiments.

One example described in the present disclosure is directed to a computer-implemented method to perform end-to-end self-supervised pre-training. The method includes obtaining, by a computing system comprising one or more computing devices, a series of input data. The method includes processing, by the computing system, the series of input data with a first encoder portion of a machine learning model to generate a plurality of encoded features.

The method includes quantizing, by the computing system, the plurality of encoded features to generate a plurality of target quantized vectors and a plurality of discretized identifiers associated with the plurality of target quantized vectors. The method includes masking, by the computing system, one or more of the plurality of encoded features. The method includes, after said masking, processing, by the computing system, the plurality of encoded features with a second encoder portion of the machine learning model to generate a first set of context vectors. The method includes processing, by the computing system, the first set of context vectors with a third encoder portion of the machine learning model to generate a second set of context vectors. The method includes evaluating, by the computing system, a loss function comprising a contrastive loss term and a masked modeling term, wherein the contrastive loss term evaluates a contrastive pre-training output generated based on the first set of context vectors and the plurality of target quantized vectors, and wherein the masked modeling loss term evaluates a masked modeling pre-training output generated based on the second set of context vectors and the plurality of discretized identifiers. The method includes training, by the computing system, the machine learning model end-to-end based on the loss function.

For each of one or more masked positions the contrastive pre-training output may comprise a predicted selection from a set of candidate vectors, the predicted selection generated based on one of the first set of context vectors that corresponds to the masked position. The set of candidate vectors may comprise a true target quantized vector and one or more distractor vectors. The contrastive loss term may evaluate whether the predicted selection corresponds to the true target quantized vector.

For each of one or more masked positions: the masked modeling pre-training output may comprise a predicted identifier generated based on one of the second set of context vectors that corresponds to the masked position, and the masked modeling loss term may evaluate whether the predicted identifier corresponds to a true discretized identifier of the plurality of discretized identifiers that corresponds to the masked position.

The second encoder portion of the machine learning model may comprise one or more conformer blocks. Similarly, the encoder portion may comprise one or more conformer blocks.

Training, by the computing system, the machine learning model based on the loss function may comprise modifying, by the computing system, one or more values of one or more parameters of the third encoder portion, the second encoder portion, and the first encoder portion of the machine learning model based on the masked modeling loss term. Training the machine learning model may further comprise modifying, by the computing system, one or more values of one or more parameters of the second encoder portion and the first encoder portion of the machine learning model based on a combination of the masked modeling loss term and the contrastive loss term.

The method may comprise modifying a codebook used to perform quantizing based on the loss function.

The series of input data may comprises audio data or spectrographic representations of the audio data. For example, the audio data may comprise speech data. For example, the machine learning model may be a model for performing a speech related task, such as speech recognition and/or speech translation. The series of input data may additionally or alternatively comprise textual data, sensor data and/or image data.

Another example described in the present disclosure is directed to one or more non-transitory computer-readable media that collectively store instructions that when executed by one or more processors of a computing system cause the computing system to perform operations. For example, the operations may include operations to perform any of the methods described herein. For example, the operations may include obtaining a task-specific training input. The operations include processing the task-specific training input with a machine learning model to generate a task-specific training output, wherein at least an encoder portion of the machine learning model has been trained end-to-end using a loss function comprising a contrastive loss term and a masked modeling term, wherein the contrastive loss term evaluates a contrastive pre-training output generated based on a first set of context vectors and a plurality of target quantized vectors, the first set of context vectors generated by the encoder portion of the machine learning model after masking of an input or intermediate output of the encoder portion of the machine learning model, the plurality of target quantized vectors generated by quantization of the input or intermediate output of the encoder portion of the machine learning model, and wherein the masked modeling loss term evaluates a masked modeling pre-training output generated based on a second set of context vectors and a plurality of discretized identifiers, the second set of context vectors generated by the encoder portion of the machine learning model from the first set of context vectors, the plurality of discretized identifiers generated by quantization of the input or intermediate output of the encoder portion of the machine learning model. The operations include evaluating a task-specific loss function based on the task-specific training output. The operations include training the machine learning model based on the task-specific loss function.

Another example aspect of the present disclosure is directed to a computing system. The computing system includes one or more processors and one or more non-transitory computer-readable media that collectively store instructions that when executed by the one or more processors of a computing system cause the computing system to perform operations. The operations may include any of the methods described herein. For example, the operations may include obtaining a task-specific inference input. The operations include processing the task-specific inference input with a machine-learned model to generate a task-specific inference output, wherein at least an encoder portion of the machine-learned model has been trained end-to-end using a loss function comprising a contrastive loss term and a masked modeling term, wherein the contrastive loss term evaluates a contrastive pre-training output generated based on a first set of context vectors and a plurality of target quantized vectors, the first set of context vectors generated by the encoder portion of the machine-learned model after masking of an input or intermediate output of the encoder portion of the machine-learned model, the plurality of target quantized vectors generated by quantization of the input or intermediate output of the encoder portion of the machine-learned model, and wherein the masked modeling loss term evaluates a masked modeling pre-training output generated based on a second set of context vectors and a plurality of discretized identifiers, the second set of context vectors generated by the encoder portion of the machine-learned model from the first set of context vectors, the plurality of discretized identifiers generated by quantization of the input or intermediate output of the encoder portion of the machine-learned model. The operations include providing the task-specific inference output as an output.

Other examples described in the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
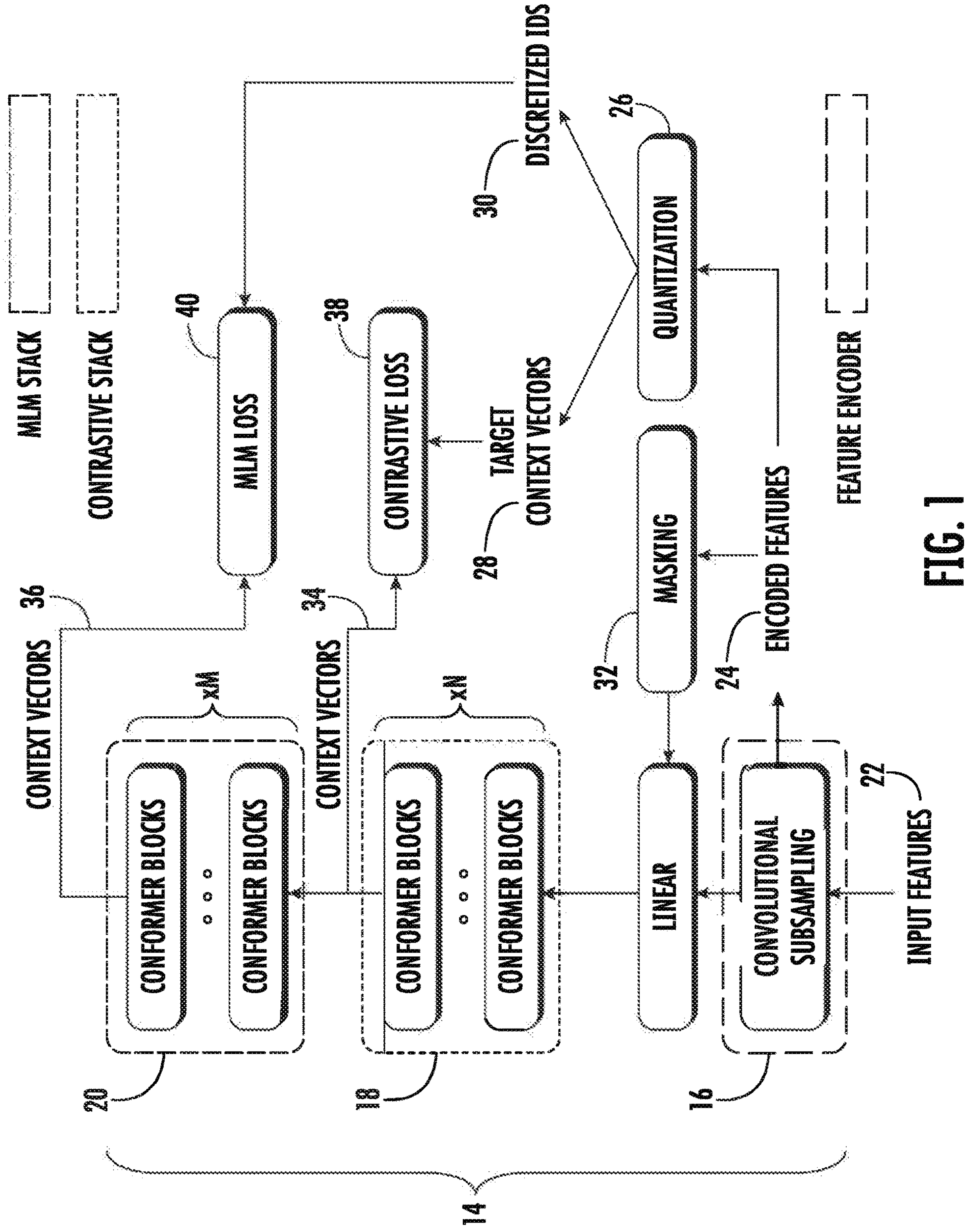
FIG. 1 depicts a block diagram of an example pre-training framework according to examples described in the present disclosure.

Reference numerals that are repeated across plural figures are intended to identify the same features in various implementations.

DETAILED DESCRIPTION

Overview

Generally, the present disclosure is directed to improved end-to-end self-supervised pre-training frameworks that leverage a combination of contrastive and masked modeling loss terms. In particular, the present disclosure provides a framework that combines contrastive learning and masked modeling, where the former trains the model to discretize input data (e.g., continuous signals such as continuous speech signals) into a finite set of discriminative tokens, and the latter trains the model to learn contextualized representations via solving a masked prediction task consuming the discretized tokens. In contrast to certain existing masked modeling-based pre-training frameworks which rely on an iterative re-clustering and re-training process or other existing frameworks which concatenate two separately trained modules, the proposed framework can enable a model to be optimized in an end-to-end fashion by solving the two self-supervised tasks (the contrastive task and masked modeling) simultaneously.

More particularly, example aspects of the present disclosure focus on improving the ability to perform unsupervised pre-training by proposing a novel pre-training framework. Example implementations of the proposed framework use a contrastive pre-training task to obtain an inventory of a finite set of discriminative, discretized speech units, and then use them as targets in a masked prediction task. Although the masked prediction task requires the model to consume tokens that are to be learned by solving the contrastive task first, the present disclosure demonstrates that in practice the two objectives can be optimized simultaneously.

The pre-training framework described herein can be applied to many different tasks, domains, and/or data modalities. One specific example task is automatic speech recognition. Another example task is speech translation. Thus, the input data can include audio data such as speech data (e.g., represented in raw form or using spectrographs). In other examples, the input data can include other forms of data including textual data (e.g., natural language data), sensor data, image data, biological or chemical data, and/or other forms of data. Once pre-trained, the model can be fine-tuned to perform any number of different tasks.

The systems and methods of the present disclosure provide a number of technical effects and benefits. As one example technical advance, the present disclosure provides a pre-training framework that directly optimizes a contrastive loss and a masked prediction loss simultaneously for end-to-end self-supervised representation learning. The pre-training framework can yield state-of-the-art performance on various tasks. For example, the framework is shown to yield state-of-the-art performance on the well-benchmarked LibriSpeech task and to greatly improve performance on a real-world recognition task (voice search) over existing state-of-the-art approaches. Thus, the pre-training framework described herein can enable improved model performance on a number of different tasks, which corresponds to an improvement in the computing system itself.

As another example technical effect, the improved pre-training framework described herein can lead to better pre-trained models which can be more quickly or easily fine-tuned for various downstream tasks. That is, by providing an improved pre-trained model as a potential checkpoint from which to start for a given task, less fine-tuning is needed to be performed to achieve comparable performance. This can result in less fine-tuning training needing to be performed which corresponds to conservation of computing resources such as processor usage, memory usage, network bandwidth, etc. Likewise, an improved pre-trained model can enable fine-tuning of the model for tasks where only a limited amount of fine-tuning training data is available. Thus, the proposed framework can enable application of machine learning technologies to various domains or tasks which were previously not available.

With reference now to the Figures, example embodiments of the present disclosure will be discussed in further detail.

Example Pre-Training Framework

FIG. 1 depicts a block diagram of an example pre-training framework that can be used to pre-train a machine learning model 14. The machine learning model 14 can include a first encoder portion 16, a second encoder portion 18, and a third encoder portion 20. The example architectures shown in FIG. 1 are provided as examples only. The model 14 and its portions 16, 18, and 20 can have various architectures which are similar or different to the ones shown in FIG. 1.

The pre-training process can be performed on a series of input data 22. As one example, the input data 22 can be samples from a continuous signal. As examples, the input data 22 can be audio data (e.g., raw audio data or audio data represented using spectrograms) (e.g., the audio data can be speech data), textual data, image data, sensor data, biological or chemical data, and/or combinations thereof. The input data 22 can be formatted as a sequence with a number of positions (e.g., positions 1, 2, 3, . . . , j).

The first encoder portion 16 of the machine learning model 14 can process the input data 22 to generate a plurality of encoded features 24. In one example, as illustrated in FIG. 1, the first encoder portion 16 can be a convolutional subsampling block that, for example, includes two 2D-convolution layers, both with strides (2, 2), resulting in a 4× reduction in the input's sequence length. Given, for example, a log-mel spectrogram as input, the first encoder portion 16 can extract latent representations that will be taken as input by the second encoder portion 18.

A quantization technique 26 can be performed on the plurality of encoded features 24 to generate a plurality of target quantized vectors 28 and a plurality of discretized identifiers 30 associated with the plurality of target quantized vectors 28.

As one example, in some implementations, the quantization technique 26 can include performing product quantization. Product quantization can include choosing quantized representations from multiple codebooks and concatenating them. Given a number of codebooks, or groups, each having a number of entries, the quantization technique 26 can include choosing one entry from each codebook, concatenating the resulting vectors, and then applying a linear transformation to obtain the quantized vectors 28. In some implementations, use of the Gumbel softmax can enable choosing discrete codebook entries in a fully differentiable way. In some implementations, the straight-through estimator can be used and G hard Gumbel softmax operations can be set up. The feature encoder output can be mapped to a number of logits which correspond to the different codebook entries. In the backward pass, the true gradient of the Gumbel softmax outputs can be used.

Referring again to FIG. 1, one or more of the plurality of encoded features 24 can be masked 32. For example, masking 32 can be performed at one or more of the number of positions associated with the input data 22 and the positions at which masking 32 is performed can thereafter be referred to as "masked positions". In one example, masking 32 can include setting the feature value equal to zero. In another example, masking 32 can include changing the feature value to equal some other value (e.g., a random noise value).

After said masking 32, the second encoder portion 18 of the machine learning model 14 can process the plurality of encoded features 24 to generate a first set of context vectors 34. In one example, the second encoder portion 18 can include a linear projection layer followed by a stack of conformer blocks. See Gulati et al., Conformer: Convolution-augmented transformer for speech recognition, in Inter speech, 2020. Each of the conformer blocks can include a series of multi-headed self-attention (Vaswani et al., Attention is all you need, in NIPS, 2017), depth-wise convolution and feed-forward layers.

In the illustrated framework, one goal of the second encoder portion 18 is to discretize the (masked) encoded features 24 into a finite set of representative units. For this purpose, the second encoder portion 18 can interoperate with the quantization mechanism 26. Specifically, the encoded features 24 output by the first encoder portion 16 can, on one hand, be fed into the linear projection layer followed by the stack of conformer blocks after masking to produce the first set of context vectors 34. On the other hand, the encoded features 24 can be passed to the quantizer 26 without masking to yield quantized vectors 28 and their assigned token IDs 30. The quantized vectors 28 can be used in conjunction with the first set of context vectors 34 that correspond to the masked positions to solve a contrastive task. The assigned token IDs 30 can be later used by the subsequent masked prediction aspect as a prediction target.

In particular, referring still to FIG. 1, the third encoder portion 20 of the machine learning model 14 can process the first set of context vectors 34 to generate a second set of context vectors 36. As one example, as illustrated in FIG. 1, the third encoder portion 20 can include a stack of conformer blocks, where each block has an identical configuration to those from the second encoder portion 18. The third encoder portion 20 can directly take in the first set of context vectors 34 and extract high-level contextualized representations.

The pre-training process can include evaluating a loss function that includes both a contrastive loss term 38 and a masked modeling term 40. Specifically, the contrastive loss term 38 can evaluate a contrastive pre-training output generated based on the first set of context vectors 34 and the plurality of target quantized vectors 28.

In particular, in one example, for a context vector $c_t$ corresponding to a masked time step (position) t, the model 14 (inclusive of supplemental pre-training prediction components) is asked to identify its true quantized vector $q_t$ from a set of K distractors $\{\tilde{q}_1, \tilde{q}_2, \ldots, \tilde{q}_k\}$. For example, the distractors can be quantized vectors uniformly sampled from other masked positions of the general input set (e.g., utterance for speech inputs). This portion of the loss can be denoted as $L_w$.

In one example, $L_w$ is as follows:

$$-\log \frac{\exp(sim(c_t, q_t)/\kappa)}{\sum_{\tilde{q}\sim Q_t} \exp(sim(c_t, \tilde{q})/\kappa)}$$

where $$sim(a, b) = a^T b / \|a\| \|b\|$$

is the cosine similarity between the context vector and the quantized vector.

The loss $L_w$ described above can be further augmented with a codebook diversity loss $L_d$ to encourage an uniform usage of codes. Therefore, one example final contrastive loss can be defined as:

$$L_c = L_w + \alpha \cdot L_d$$

In one example, $\alpha=0.1$. However, other values can be used.

Thus, in some implementations, for each of one or more masked positions: the contrastive pre-training output can include a predicted selection from a set of candidate vectors, the predicted selection being generated based on one of the first set of context vectors 34 that corresponds to the masked position. In addition, the set of candidate vectors can include a true target quantized vector 28 and one or more distractor vectors and the contrastive loss term 38 can evaluate whether the predicted selection corresponds to the true target quantized vector 28.

The contrastive loss 38 can be used to train the first and second encoder portions 16 and 18 along with the quantizer 26, such that the first and second encoder portions 16, 18 yield adequate context vectors 34 that will be taken as input by the third encoder portion 20, and the quantizer 26 produces discriminative discretized tokens that will be used by the third encoder portion 20 as targets.

In particular, the masked modeling loss term 40 can evaluate a masked modeling pre-training output generated based on the second set of context vectors 36 and the plurality of discretized identifiers 30.

In particular, in one example, a softmax layer is appended on top of the third encoder portion 20. If a context vector 36 at the final layer corresponds to a masked position, the softmax layer will take the context vector 36 as input and attempt to predict its corresponding token ID 30, which is assigned earlier by the quantizer 26. An example cross-entropy loss for this masked prediction task can be denoted as $L_m$.

Thus, in some implementations, for each of one or more masked positions: the masked modeling pre-training output can include a predicted identifier generated based on one of the second set of context vectors 36 that corresponds to the masked position. The masked modeling loss term 40 can evaluate whether the predicted identifier corresponds to a true discretized identifier of the plurality of discretized identifiers 30 that corresponds to the masked position.

The machine learning model 14 can be trained end-to-end based on the loss function that includes both the contrastive loss term 38 and the masked modeling term 40. Thus, the model 14 can be trained to solve the two self-supervised tasks at the same time. One example final training loss to be minimized can be:

$$L_p = \beta \cdot L_c + \gamma \cdot L_m$$

In some examples, both $\beta$ and $\gamma$ can be set equal to 1. However, other values can be used.

Example Fine-Tuning Approach

Figure 2:
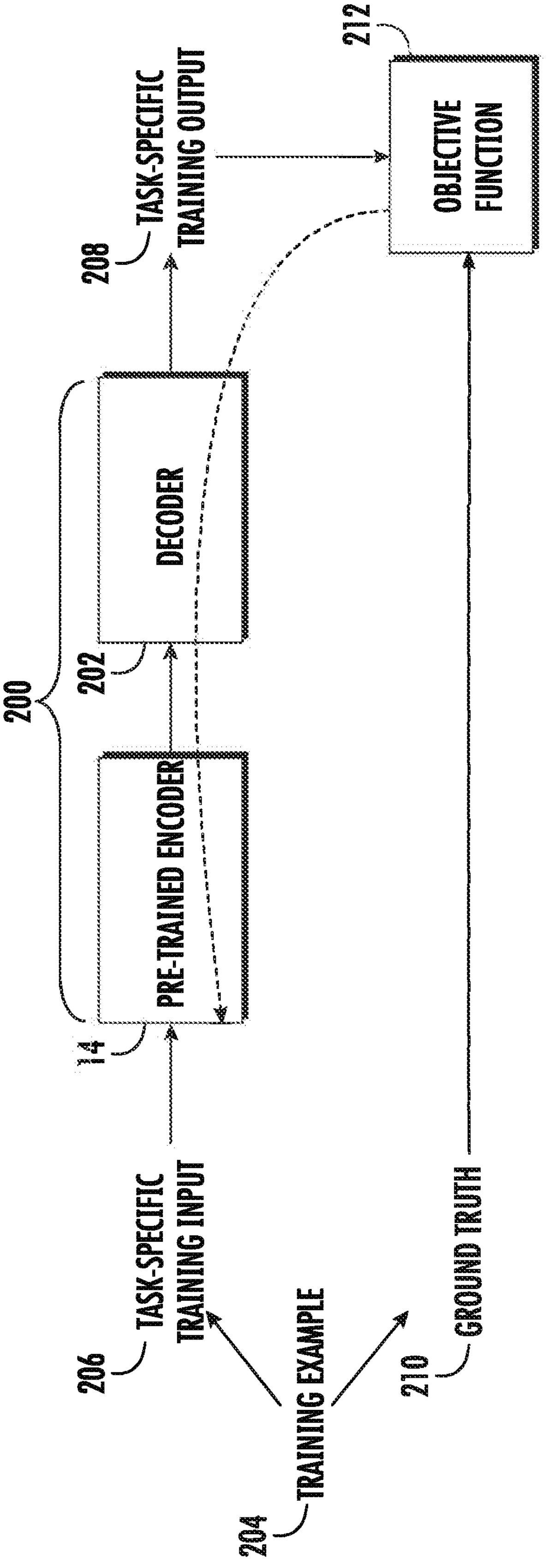
FIG. 2 depicts a block diagram of an example training framework according to examples described in the present disclosure.

FIG. 2 shows a block diagram of an example fine-tuning training approach which can be used to train a machine learning model 200. The model 200 can include the pre-trained encoder model 14 (e.g., pre-trained as shown in FIG. 1). For example, the model 14 can include encoder portions 16, 18, and 20 which have been pre-trained on a loss function that includes both the contrastive loss 38 and the masked modeling loss 40, as shown in FIG. 1.

Referring now to FIG. 2, the model can also include a decoder portion 202. The training scheme shown in FIG. 2 can operate over a number of training examples. One training example 204, shown in FIG. 2, includes a task-specific training input 206 and a ground truth 210 (e.g., a label).

The training example 204 can be a specific example for any different task, domain, and/or data modality. Example data modalities include text, audio, imagery, sensor data, and/or other forms of data. Example tasks can include recognition tasks, translation tasks, detection tasks, synthesis tasks, prosody classification, emotion or sentiment classification, and/or various other tasks which can be performed on any of the data modalities given above. Two particular example tasks include automatic speech recognition and speech translation.

The pre-trained encoder 14 can process the input 206 to generate contextual representations. The decoder can process the contextual representations to generate a task-specific training output 208.

An objective function 212 can compare the task-specific training output 208 to the ground truth 210. The model 200 can be trained based on the objective function 212 (e.g., by backpropagation of the objective function through the decoder 202 and/or the pre-trained encoder 14).

Example Inference Approach

Figure 3:
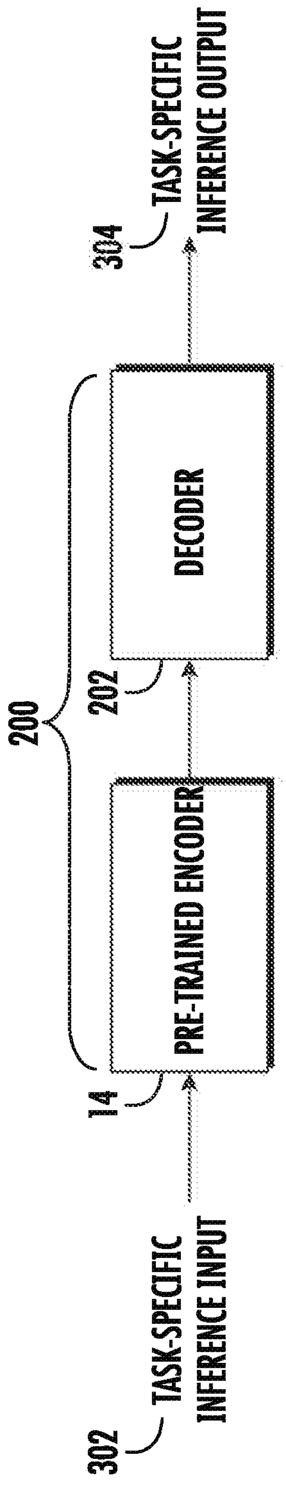
FIG. 3 depicts a block diagram of an example inference framework according to examples described in the present disclosure.

FIG. 3 shows a block diagram of an example inference approach which can be used after training the machine learning model 200. In particular, the model 200 can include the pre-trained encoder model 14 (e.g., pre-trained as shown in FIG. 1 and fine-tuned as shown in FIG. 2) and the decoder portion 202 (e.g., fine-tuned as shown in FIG. 2).

Referring now to FIG. 3, the inference scheme shown in FIG. 3 can operate over a number of inference inputs. One task-specific inference input 302 is shown in FIG. 3. The inference input 302 can be a specific input for any different task, domain, and/or data modality. Example data modalities include text, audio, imagery, sensor data, and/or other forms of data. Example tasks can include recognition tasks, translation tasks, detection tasks, synthesis tasks, prosody classification, emotion or sentiment classification, and/or various other tasks which can be performed on any of the data modalities given above. Two particular example tasks include automatic speech recognition and speech translation.

The pre-trained encoder 14 can process the inference input 302 to generate contextual representations. The decoder can process the contextual representations to generate a task-specific inference output 304.

Example Devices and Systems

Figure 4A:
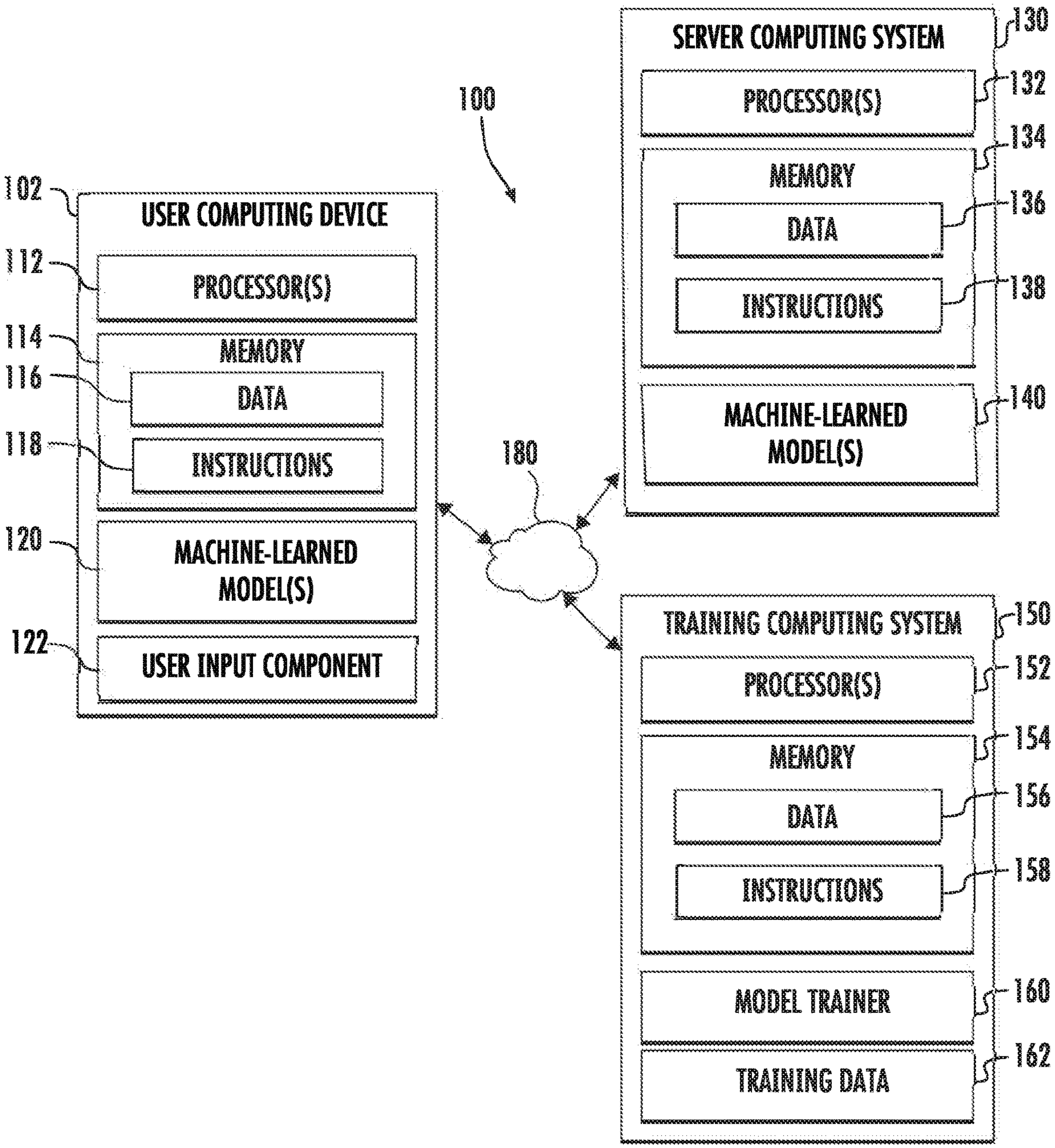
FIG. 4A depicts a block diagram of an example computing system according to examples described in the present disclosure.

FIG. 4A depicts a block diagram of an example computing system 100. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel prediction across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
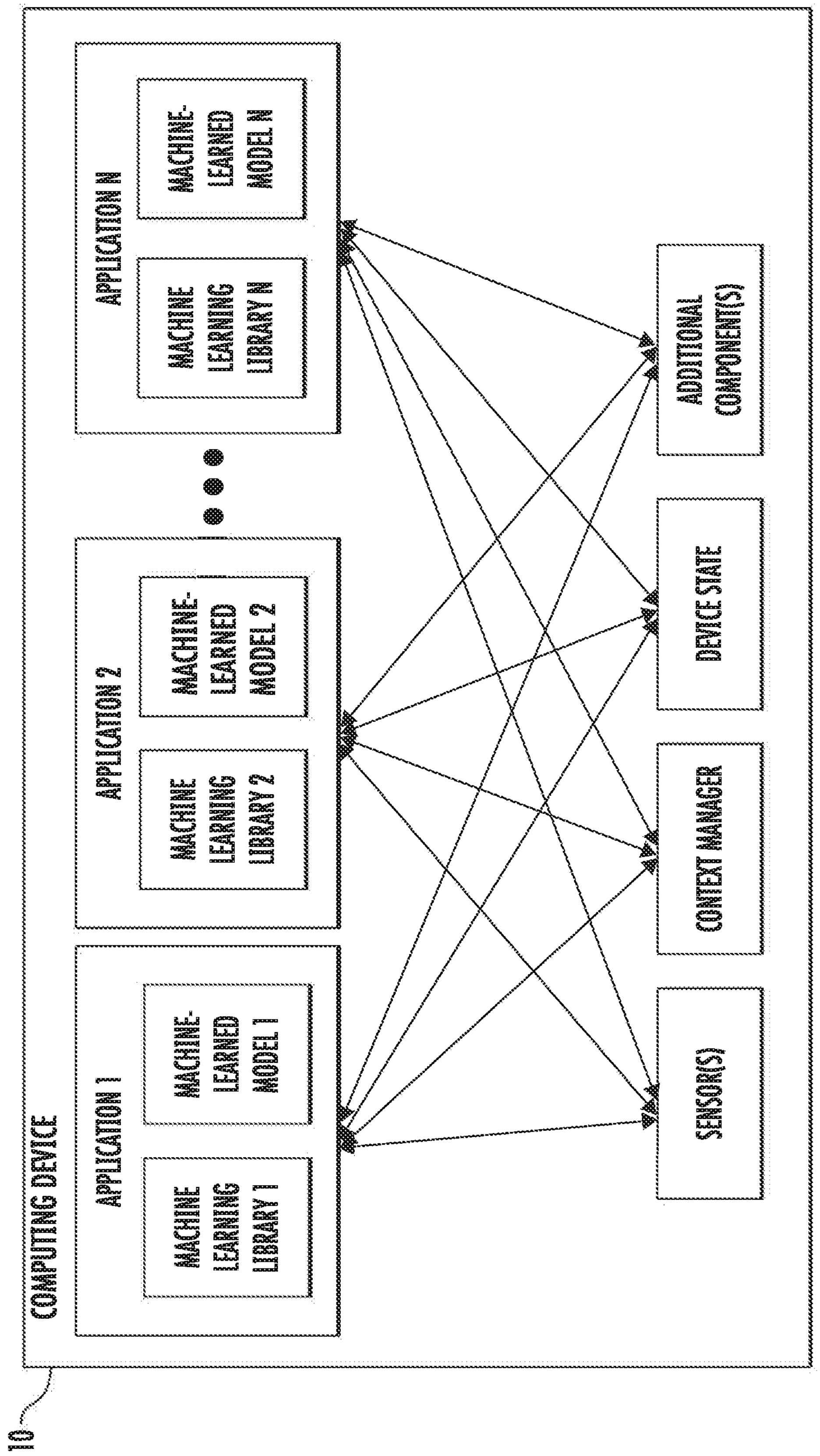
FIG. 4B depicts a block diagram of an example computing device according to examples described in the present disclosure.

FIG. 4B depicts a block diagram of an example computing device 10 that performs operations described in the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
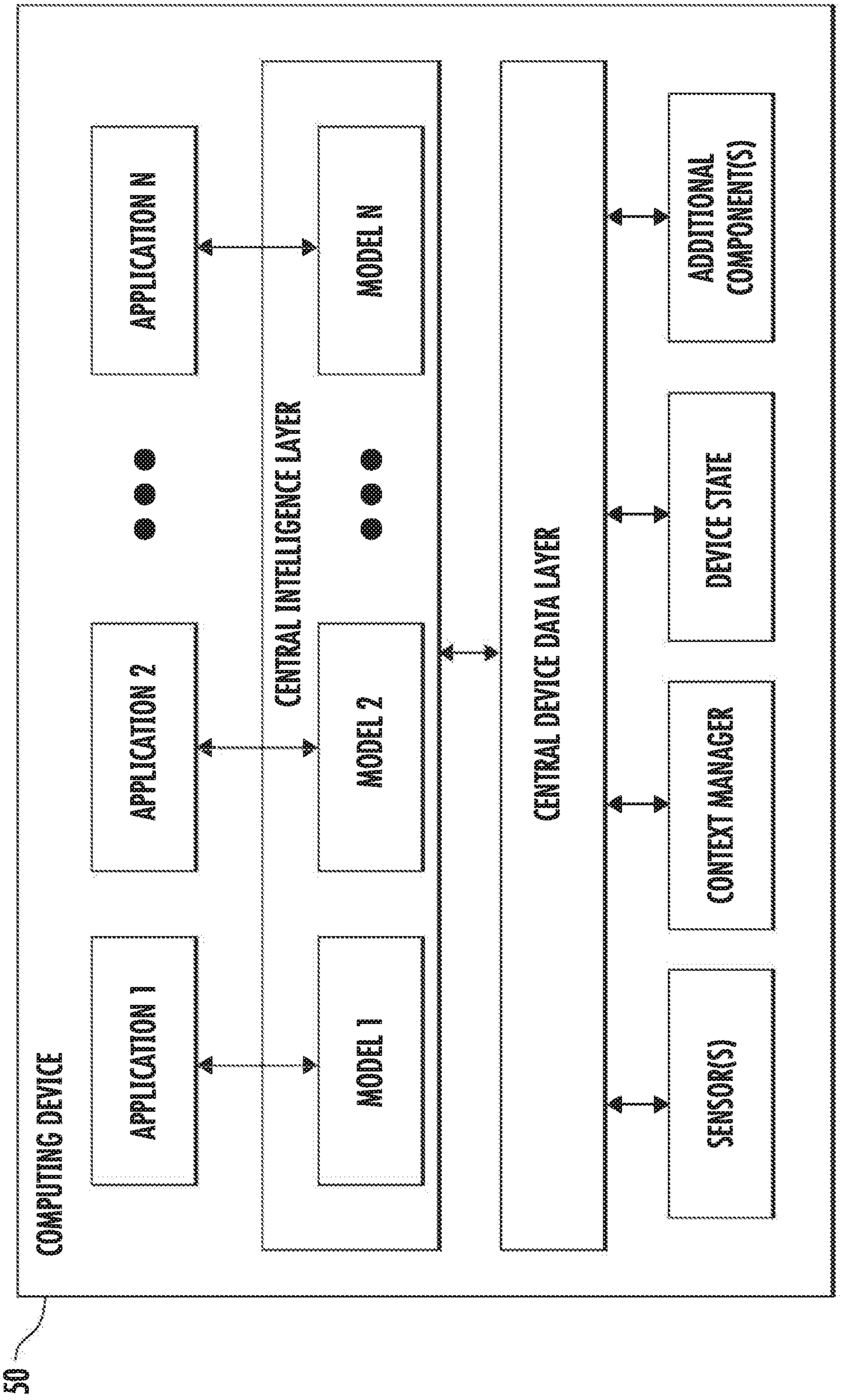
FIG. 4C depicts a block diagram of an example computing device according to examples described in the present disclosure.

FIG. 4C depicts a block diagram of an example computing device 50 that performs operations described in the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific examples, each example is provided by way of explanation, not limitation of the disclosure. Those skilled in the art, upon attaining an understanding of the foregoing, can readily produce alterations to, variations of, and equivalents to such examples. Accordingly, the subject disclosure does not preclude inclusion of such modifications, variations and/or additions to the present subject matter as would be readily apparent to one of ordinary skill in the art. For instance, features illustrated or described as part of one example can be used with another example to yield a still further example. Thus, it is intended that the present disclosure cover such alterations, variations, and equivalents.

What is claimed is:

1. A computer-implemented method to perform self-supervised pre-training, the method comprising:
- obtaining, by a computing system comprising one or more computing devices, a series of input data;
- processing, by the computing system, the series of input data with a first encoder portion of a machine learning model to generate a plurality of encoded features;
- quantizing, by the computing system, the plurality of encoded features to generate a plurality of target quantized vectors and a plurality of discretized identifiers associated with the plurality of target quantized vectors;
- masking, by the computing system, one or more of the plurality of encoded features;
- after said masking, processing, by the computing system, the plurality of encoded features with a second encoder portion of the machine learning model to generate a first set of context vectors;
- processing, by the computing system, the first set of context vectors with a third encoder portion of the machine learning model to generate a second set of context vectors;
- evaluating, by the computing system, a loss function comprising a contrastive loss term and a masked modeling term, wherein the contrastive loss term evaluates a contrastive pre-training output generated based on the first set of context vectors and the plurality of target quantized vectors, and wherein the masked modeling loss term evaluates a masked modeling pre-training output generated based on the second set of context vectors and the plurality of discretized identifiers; and
- training, by the computing system, the machine learning model based on the loss function.

2. The computer-implemented method of claim 1, wherein, for each of one or more masked positions:
- the contrastive pre-training output comprises a predicted selection from a set of candidate vectors, the predicted selection generated based on one of the first set of context vectors that corresponds to the masked position;
- the set of candidate vectors comprises a true target quantized vector and one or more distractor vectors; and
- the contrastive loss term evaluates whether the predicted selection corresponds to the true target quantized vector.

3. The computer-implemented method of claim 1, wherein, for each of one or more masked positions:
- the masked modeling pre-training output comprises a predicted identifier generated based on one of the second set of context vectors that corresponds to the masked position; and
- the masked modeling loss term evaluates whether the predicted identifier corresponds to a true discretized identifier of the plurality of discretized identifiers that corresponds to the masked position.

4. The computer-implemented method of claim 1, wherein the second encoder portion and/or third encoder portion of the machine learning model comprises one or more conformer blocks.

5. The computer-implemented method of claim 1, wherein the third encoder portion of the machine learning model comprises one or more conformer blocks.

6. The computer-implemented method of claim 1, wherein training, by the computing system, the machine learning model based on the loss function comprises:

modifying, by the computing system, one or more values of one or more parameters of the third encoder portion, the second encoder portion, and the first encoder portion of the machine learning model based on the masked modeling loss term; and modifying, by the computing system, one or more values of one or more parameters of the second encoder portion and the first encoder portion of the machine learning model based on a combination of the masked modeling loss term and the contrastive loss term.

7. The computer-implemented method of claim 1, further comprising:

modifying, by the computing system, a codebook used to perform said quantizing based on the loss function.

8. The computer-implemented method of claim 1, wherein the series of input data comprises audio data or spectrographic representations of the audio data.

9. The computer-implemented method of claim 8, wherein the audio data comprises speech data.

10. The computer-implemented method of claim 1, wherein the series of input data comprises textual data.

11. The computer-implemented method of claim 1, wherein the series of input data comprises sensor data or image data.

12. One or more non-transitory computer-readable media that collectively store instructions that when executed by one or more processors of a computing system cause the computing system to perform operations, the operations comprising:

obtaining a task-specific training input;

processing the task-specific training input with a machine learning model to generate a task-specific training output, wherein at least an encoder portion of the machine learning model has been trained using a loss function comprising a contrastive loss term and a masked modeling term, wherein the contrastive loss term evaluates a contrastive pre-training output generated based on a first set of context vectors and a plurality of target quantized vectors, the first set of context vectors generated by the encoder portion of the machine learning model after masking of an input or intermediate output of the encoder portion of the machine learning model, the plurality of target quantized vectors generated by quantization of the input or intermediate output of the encoder portion of the machine learning model, and wherein the masked modeling loss term evaluates a masked modeling pre-training output generated based on a second set of context vectors and a plurality of discretized identifiers, the second set of context vectors generated by the encoder portion of the machine learning model from the first set of context vectors, the plurality of discretized identifiers generated by quantization of the input or intermediate output of the encoder portion of the machine learning model;

evaluating a task-specific loss function based on the task-specific training output; and training the machine learning model based on the task-specific loss function.

13. The one or more non-transitory computer-readable media of claim 12, wherein, for each of one or more masked positions:

the contrastive pre-training output comprises a predicted selection from a set of candidate vectors, the predicted selection generated based on one of the first set of context vectors that corresponds to the masked position;

the set of candidate vectors comprises a true target quantized vector and one or more distractor vectors; and the contrastive loss term evaluates whether the predicted selection corresponds to the true target quantized vector.

14. The one or more non-transitory computer-readable media of any of claim 12, wherein the machine learning model comprises a decoder portion configured to process an output of the encoder portion to generate the task-specific training output.

15. The one or more non-transitory computer-readable media of any of claim 12, wherein:

the task-specific training input comprises speech data; and the task-specific training output comprises a translation of the speech data or speech recognition for the speech data.

16. A computing system, comprising:

one or more processors; and one or more non-transitory computer-readable media that collectively store instructions that when executed by the one or more processors of a computing system cause the computing system to perform operations, the operations comprising:

obtaining a task-specific inference input;

processing the task-specific inference input with a machine-learned model to generate a task-specific inference output, wherein at least an encoder portion of the machine-learned model has been trained using a loss function comprising a contrastive loss term and a masked modeling term, wherein the contrastive loss term evaluates a contrastive pre-training output generated based on a first set of context vectors and a plurality of target quantized vectors, the first set of context vectors generated by the encoder portion of the machine-learned model after masking of an input or intermediate output of the encoder portion of the machine-learned model, the plurality of target quantized vectors generated by quantization of the input or intermediate output of the encoder portion of the machine-learned model, and wherein the masked modeling loss term evaluates a masked modeling pre-training output generated based on a second set of context vectors and a plurality of discretized identifiers, the second set of context vectors generated by the encoder portion of the machine-learned model from the first set of context vectors, the plurality of discretized identifiers generated by quantization of the input or intermediate output of the encoder portion of the machine-learned model; and providing the task-specific inference output as an output.

17. The computing system of claim 16, wherein, for each of one or more masked positions:

the contrastive pre-training output comprises a predicted selection from a set of candidate vectors, the predicted selection generated based on one of the first set of context vectors that corresponds to the masked position;

the set of candidate vectors comprises a true target quantized vector and one or more distractor vectors; and the contrastive loss term evaluates whether the predicted selection corresponds to the true target quantized vector.

18. The computing system of claim 16, wherein, for each of one or more masked positions:

the masked modeling pre-training output comprises a predicted identifier generated based on one of the second set of context vectors that corresponds to the masked position; and the masked modeling loss term evaluates whether the predicted identifier corresponds to a true discretized identifier of the plurality of discretized identifiers that corresponds to the masked position.

19. The computer-implemented method of claim 1, wherein the first set of context vectors generated by the second encoder portion are provided as input to the third encoder portion, and the second set of context vectors are generated based on output from the processing of the first set of context vectors.

20. The computer-implemented method of claim 1, wherein the discretized identifiers are generated by quantizing the plurality of encoded features before masking, the first set of context vectors are generated by processing the plurality of encoded features after masking, and the third encoder portion is trained using the masked modeling pre-training output.

* * * * *